United States Patent [19]

Maurer

[11] Patent Number: 4,768,548

[45] Date of Patent: Sep. 6, 1988

[54] PRESSURE REDUCER

[75] Inventor: Christoph Maurer, Techau, Fed. Rep. of Germany

[73] Assignee: Drägerwerk Aktiengesellschaft, Lübeck, Fed. Rep. of Germany

[21] Appl. No.: 151,165

[22] Filed: Feb. 1, 1988

[30] Foreign Application Priority Data

Jan. 31, 1987 [DE] Fed. Rep. of Germany ....... 3702958

[51] Int. Cl.$^4$ ............................................. G05D 16/00
[52] U.S. Cl. ................................................. 137/487.5
[58] Field of Search ............................... 137/487.5, 85

[56] References Cited

U.S. PATENT DOCUMENTS

| | | | |
|---|---|---|---|
| 3,464,438 | 9/1969 | Maurer | 137/487.5 |
| 3,482,588 | 12/1969 | Kreuter | 137/85 |
| 3,586,027 | 6/1971 | Fitzgerald | 137/487.5 X |
| 3,811,465 | 5/1974 | Abbey | 137/487.5 |
| 4,061,155 | 12/1977 | Sopba | 137/85 |
| 4,596,264 | 6/1986 | Gladstone | 137/85 |

*Primary Examiner*—Alan Cohan
*Attorney, Agent, or Firm*—Walter Ottesen

[57] ABSTRACT

The invention is directed to a pressure reducer wherein the outlet pressure thereof is regulated by means of a comparison of the desired value with the actual value such that the adjusting range is expanded. This expansion of the adjusting range is obtained in that the adjustment of the biasing force of the membrane effects a corresponding adaptation of the desired value applied to a control unit via a position-value transmitter.

4 Claims, 1 Drawing Sheet

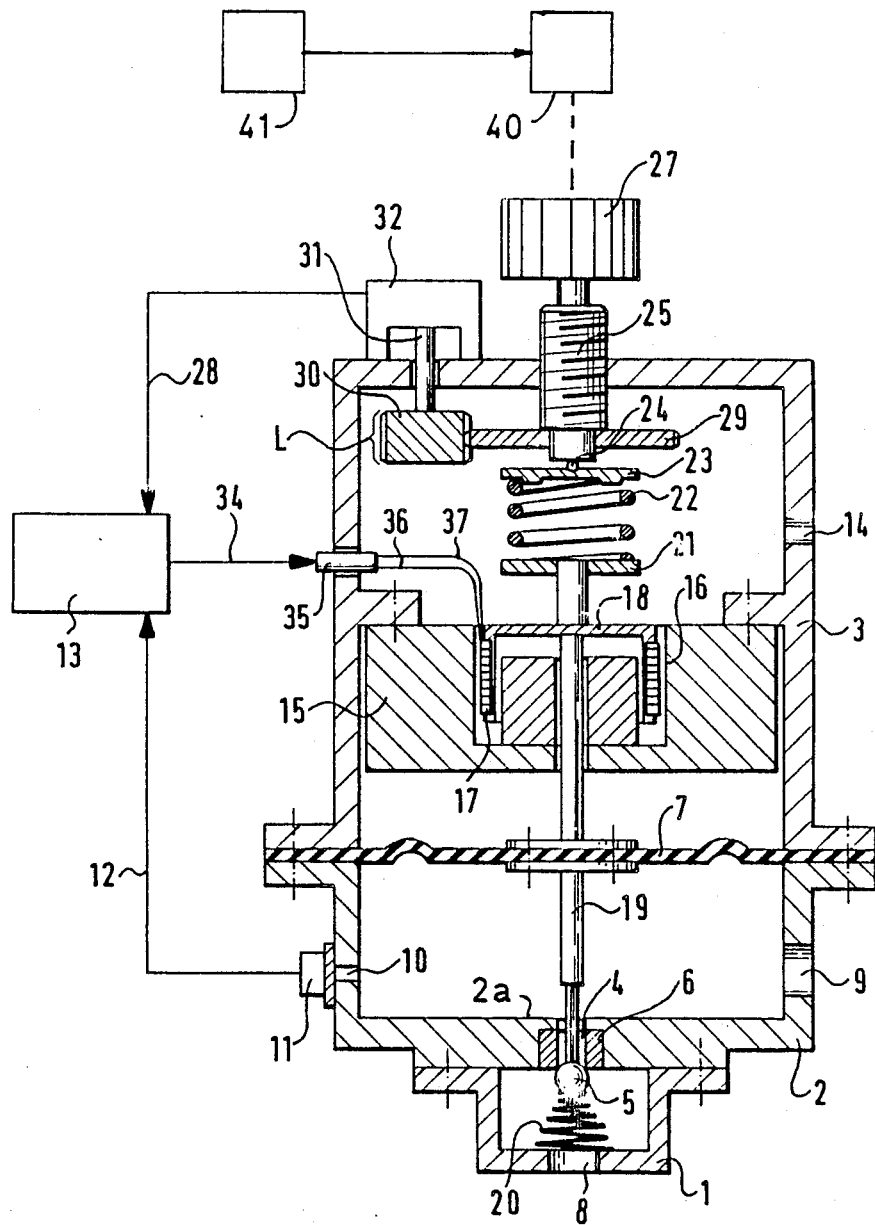

PRESSURE REDUCER

FIELD OF THE INVENTION

The invention relates to a pressure reducer having an inlet chamber and an outlet chamber. The inlet chamber is connectable to the outlet chamber via a valve which is actuable via a coupling element. This coupling element is attached to a pressure-sensitive membrane which closes off the outlet chamber with respect to the ambient. A pressure sensor senses the pressure in the outlet chamber and is connected to a control unit. The coupling element is movable via the control unit by means of a displacing arrangement which displaces the coupling element in correspondence to a displacement control signal obtained from a comparison of the measured output pressure value and a desired pressure value. The displacing arrangement is adjustable by means of a resilient control element which can be changed with respect to its biasing force.

BACKGROUND OF THE INVENTION

A pressure reducer is disclosed in U.S. Pat. No. 3,811,465. In the pressure reducer disclosed in this patent, the valve is opened by means of a regulating element in the form of an adjustable spring and a displacing arrangement configured as a plunge coil. The regulating element is resiliently biased and preset to a base tension and the valve is opened until an equilibrium is established between the preset outlet pressure which acts on the membrane in the outlet chamber and the counterforce applied to the membrane by the adjustable spring and the plunge coil. The output pressure is continuously monitored by the regulating unit and held to the desired value by means of a control signal applied to the plunge coil. When the force of the output pressure on the membrane is in equilibrium to the oppositely directed force of the adjusting spring and the plunge coil, the regulating path is then, too, in equilibrium so that the valve remains in its center equilibrium position. The plunge-coil drive is only then without current when the biasing force of the regulating element is in equilibrium with the force on the membrane developed by the outlet pressure. That is, only for a single desired value.

It is a disadvantage of the above pressure reducer that a change of the desired outlet pressure is not possible by means of only an adjustment of the regulating element. A change in the biasing force of the regulating element would be compensated by the regulating unit and has no influence on the output pressure. Furthermore, the regulating element is provided only for adjusting purposes and has only a limited adjusting possibility. Finally, a correspondence of the two adjusted values can only be obtained with difficulty by a simultaneous manual adjustment of the regulating element as well as also of the desired-value input of the control unit. However, the deviations lead to a compensation by means of the regulating unit and a loading of the plunge-coil drive. Desired value changes therefore can only occur electrically in that the plunge coil is supplied with a continuous current such that a new equilibrium adjusts itself in correspondence to the changed desired value. The range of desired values adjustable in this manner is limited by the maximum force of the plunge-coil drive.

The pressure reducer described above can therefore only be utilized in a narrow range of desired values when one does not desire to utilize an unnecessarily large drive consuming unnecessary energy.

SUMMARY OF THE INVENTION

It is an object of the invention to provide a pressure reducer of the kind described above whose operation can encompass a wide range of desired values without increasing the drive. It is another object of the invention to provide such a pressure reducer wherein the biasing force needed for this range of desired values can be adapted to the particular area of utilization.

According to a feature of the pressure reducer of the invention, a position-value transmitter is coupled to the regulating element provided with adjusting means and is connected to the control unit via a desired-value line for transmitting the desired value.

In the pressure reducer according to the invention, a change of the desired value input is achieved by adjusting the biasing force of the regulating element by hand via an adjuster preferably when the displacing means is not loaded. The position-value transmitter transmits, for example, a signal proportional to the biasing force as a desired-value input to the control unit via a mechanical-electrical path or via an optical-electrical path. In this way, it is assured that the mechanical and the electrical desired-value inputs are always in correspondence with each other when the change is applied to only a single adjusting means. When the adjusting operation is ended, the control unit again takes over the control of the displacing element. The new desired value can in this way be maintained when the displacing element is unloaded. Only deviations of the actual value from this new desired value are compensated for by the displacing element.

In this way, a pressure reducer is obtained whose desired value can be selected within wide limits and whose deviations of the outlet pressure from the adjusted desired value can be precisely corrected with a low expenditure of energy.

According to another feature of the invention, a simple and useful embodiment of the regulating element provides that this element comprise a threaded pin having first and second ends with the first end being connected with the spring which acts upon the displacing means. The threaded pin is provided with a hand wheel at its second end.

According to a further feature of the invention, the position-value transmitter can comprise two spur gears which mesh with each other. One of the spur gears is attached to the threaded pin and the other spur gear is attached to the shaft of a rotary potentiometer. When adjusting the drive arrangement manually for adjusting a new desired value, the rotary potentiometer is also rotated in accordance with the gear ratio of the two spur gears and sends a corresponding desired-value signal to the control unit. The forced connection provided by the gear means assures a reproducible connection between the selected position of the regulating element and the electrical desired-value signal determined by the position of the potentiometer. The characteristics of the spring and of the potentiometer are brought into correspondence with each other by means of the selection of the gear ratio.

In another embodiment of the invention, the position-value transmitter can include an opto-encoder fixedly connected with the threaded pin. The opto-encoder transmits a number of pulses to the control unit which is proportional to the angle through which the hand wheel has been rotated.

According to still another embodiment of the invention, the hand wheel can be configured in the form of an electrically remote-controlled actuator. This embodiment allows the pressure reducer to be installed at a location which, on the one hand, is convenient to the flow of the gas, while on the other hand, its location is reachable only with difficulty so that the actuation of the hand wheel can be undertaken from a readily accessible location.

BRIEF DESCRIPTION OF THE DRAWING

The single FIGURE of the drawing is a schematic of the pressure reducer according to the invention shown partially in section.

DESCRIPTION OF THE PREFERRED EMBODIMENTS OF THE INVENTION

The drawing shows a pressure reducer which is comprised of three housing components, namely, the inlet chamber 1, the outlet chamber 2 and the control chamber 3. A passage 4 is provided in the connecting wall 2a between the inlet chamber 1 and the outlet chamber 2. The passage 4 is closeable by means of a ball valve (5, 6). The outlet chamber 2 and the control chamber 3 are separated from each other by a membrane 7 which is clamped between the edges of the two chambers (2, 3) with appropriate means such as threaded fasteners. The inlet chamber 1 has an inlet opening 8 and the outlet chamber 2 has an outlet opening 9. A pressure sensor 11 is mounted across the measuring opening 10 and is connected to a control unit 13 via the sensor line 12.

A permanent magnet 15 is fixedly mounted in the control chamber 3 and has a recess 16 in its central region. A plunge coil 17 acts as a displacing element and is accommodated in the recess 16 for axial movement on a carrier 18 to which the plunge coil 17 is attached. The control chamber 3 is connected to the ambient via an opening 14. The carrier 18 of the plunge coil 17 is connected to the membrane 7 via a rod 19. The rod 19 functions as a coupling element and the end of the rod is in contact engagement with the ball 5 of the ball valve (5, 6). The ball 5 is braced by the conical spring 20. The other end of the rod 19 is terminated with a plate disc 21. A helical spring 22 is seated on the disc 21 and held in place with a retainer 23 which presses against a threaded pin 25 via a bearing ball 24. The threaded pin extends through a wall of the control housing 3. Ball 5, rod 19, spring 22 and threaded pin 25 are all coaxially aligned with respect to each other. The threaded pin 25 is actuable with a hand wheel 27. Threaded pin 25, hand wheel 27 and the spring 22 conjointly define the regulating element by means of which the biasing force on the plunge coil 17 is adjustable.

The desired value which is to be regulated by means of the pressure reducer is applied via hand wheel 27 to the control unit 13. For this purpose, the rotational movement of the threaded pin 25 is transmitted via a first spur gear 29 to a second spur gear 30 which is connected with the rotary potentiometer 32 via a shaft 31. The spur gears (29, 30) and the rotary potentiometer 32 conjointly define a mechanical-electrical position-value transmitter by means of which the desired value adjusted with the hand wheel 27 is transmitted to the control unit 13 via the desired-value line 28. The second spur gear 30 has a length L which corresponds to the excursion through which the first spur gear 29 can move in the axial direction when the hand wheel 27 is actuated. For transmitting the displacement control signal, the control unit 13 is connected with the plunge coil 17 via a signal line 34, a pass-through 35 and the connecting leads (36, 37).

For operating the pressure reducer, the desired outlet pressure is set via the hand wheel 27 when no current flows through the plunge coil 17 and the position of the hand wheel 27 is transmitted to the control unit 13 via the desired-value line 28. In this way, the ball 5 lifts from its seat 6 and gas flows via the inlet opening 8 into the inlet chamber 1 and then through the valve (5, 6) into the outlet chamber 2 to the outlet opening 9 and then to a consumer (not shown). The outlet pressure in the outlet chamber 2 first adjusts itself so that the force acting on the membrane 7 because of the outlet pressure is in equilibrium to the force applied by the spring 22 to the membrane 7. The outlet pressure is measured by the pressure sensor 11 and is supplied to the control unit 13 as an actual value.

The control unit 13 forms a displacement control signal from a comparison of the desired value and the actual value and this control signal is applied via signal line 34 to the plunge coil 17 in the form of a current. The force developed in this way by the plunge coil 17 is added or subtracted from the force developed by the spring 22 in accordance with the current direction. This addition or subtraction is done in such a manner that the actual value and the desired value correspond to each other.

If it is necessary to mount the pressure reducer at a location where it is difficult to manually adjust the hand wheel 27, then an appropriate remote-controlled actuation of the hand wheel can be provided, as schematically shown in the drawing. Reference numeral 40 identifies an electrically actuated positioning motor which can be electrically remote-controlled from a controller 41.

It is understood that the foregoing description is that of the preferred embodiments of the invention and that various changes and modifications may be made thereto without departing from the spirit and scope of the invention as defined in the appended claims.

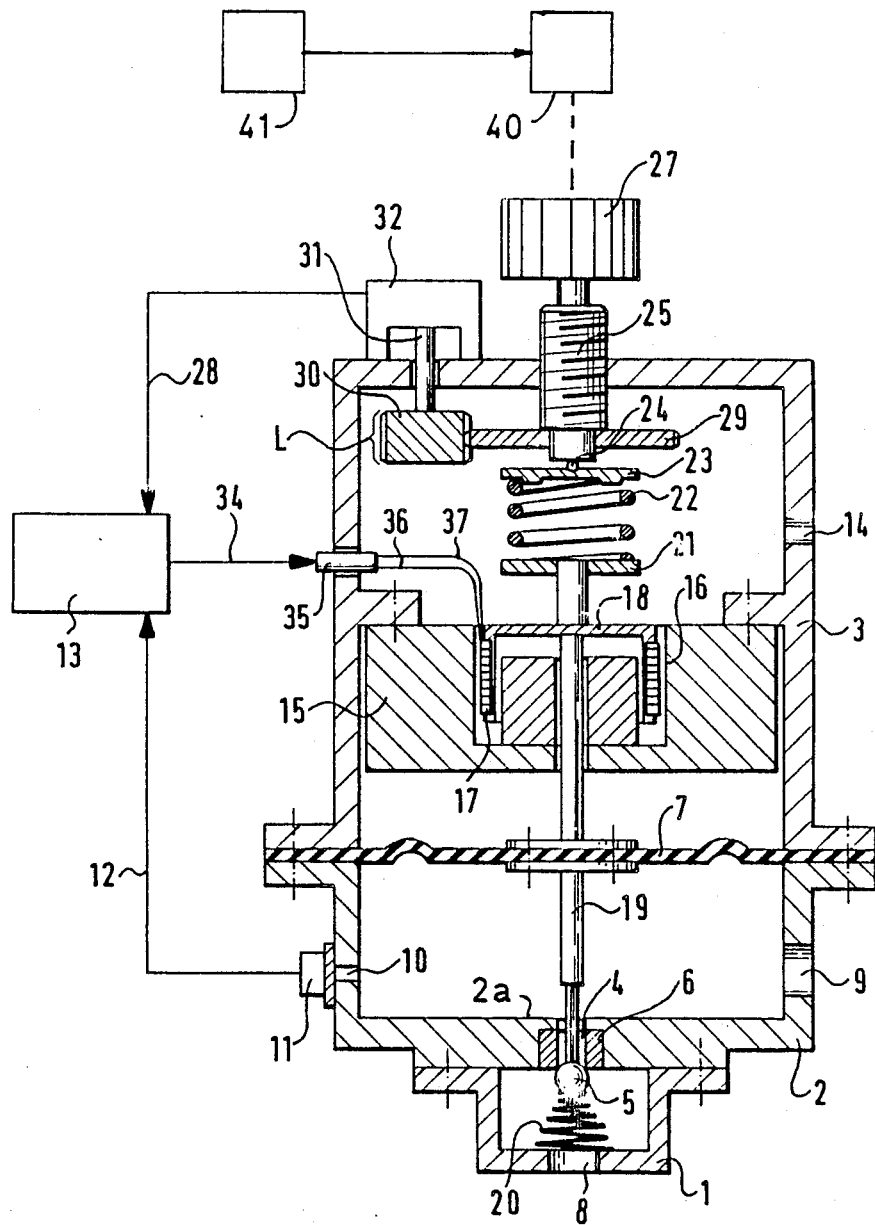

What is claimed is:

1. A pressure reducer comprising:
a housing;
inlet chamber means arranged in said housing and having an inlet opening for admitting a gas;
outlet chamber means arranged in said housing and having an outlet opening for passing the gas to a consumer;
valve means for connecting said inlet chamber with said outlet chamber and being actuable for opening a passage between said chambers to permit the gas to flow from said inlet chamber to said outlet chamber;
a pressure-responsive membrane mounted in said housing so as to seal off said outlet chamber with respect to the ambient;
a coupling member attached to said membrane and movably mounted in said housing for actuating said valve means;
displacement means for displacing said coupling member in response to a displacement control signal;
pressure-sensor means for sensing the actual pressure of the gas in said outlet chamber and transmitting a first signal indicative of said actual pressure;